United States Patent

[11] 3,603,727

[72] Inventors Masao Kinugawa
Chofu-shi;
Masachika Ikeda, Mitaka-shi; Yutaka Tanaka, Tokyo, all of, Japan
[21] Appl. No. 809,793
[22] Filed Mar. 24, 1969
[45] Patented Sept. 7, 1971
[73] Assignees Matsushita Electric Industrial Co., Ltd. Osaka, Japan;
Matsushita Graphic Communication Systems Inc.
[32] Priority Mar. 29, 1968, Mar. 29, 1968, Mar. 29, 1968
[33] Japan
[31] 43/20,208, 43/20,209 and 43/20,210

[54] VARIABLE SCALE SCANNING SYSTEM FOR IMAGE REPRODUCTION
3 Claims, 3 Drawing Figs.

[52] U.S. Cl. .......... 178/6.7 R, 178/6, 178/6.6 R, 178/7.6
[51] Int. Cl. .......... H04n 1/04, H04n 1/24, H04n 1/32
[50] Field of Search .......... 178/6.6, 6.6 A, 6.6 B, 6.7, 7.1, 7.2, 7.6, 6

[56] References Cited
UNITED STATES PATENTS

| | | | |
|---|---|---|---|
| 1,768,634 | 7/1930 | Robb | 178/6 |
| 2,666,094 | 1/1954 | Young | 178/7.1 |
| 2,987,573 | 6/1961 | Willcox | 178/6.6 |

*Primary Examiner*—Bernard Konick
*Assistant Examiner*—Howard W. Britton
*Attorney*—Stevens, Davis, Miller & Mosher

ABSTRACT: In an apparatus wherein a first record is scanned to be converted to an electric signal which is transmitted to a remote place where a second record is reproduced from said electric signal by scanning a recording medium with light rays emanating from a light source which is intensity modulated with said electrical signal, a variable scanning system using a vibrating mirror for effecting the main-scanning, wherein the scanning width in the main-scanning direction is changed by changing the vibration range (amplitude) of said vibrating mirror, and the subscanning speed and the size of the scanning light spot are controlled corespondingly to change the scanning width in the subscanning direction, thereby producing a received picture (recorded or produced picture) which is magnified or reduced as desired.

INVENTORS
MASAO KINUGAWA,
MASACHIKA IKEDA,
YUTAKA TANAKA

BY Stevens, Davis, Miller & Mosher
ATTORNEYS

INVENTORS
MASAO KINUGAWA,
MASACHIKA IKEDA,
YUTAKA TANAKA,

BY Stevens, Davis, Miller & Mosher

ATTORNEYS

VARIABLE SCALE SCANNING SYSTEM FOR IMAGE REPRODUCTION

This invention relates to a scanning system for use with facsimile apparatus or similar apparatus, and more particularly it pertains to a variable scanning system using a vibrating mirror for effecting the main scanning, which is so designed that in the case where the same is applied to a facsimile transmitter, for example, a manuscript of any size can be transmitted to be magnified or reduced at a suitable ratio, that in the case where it is applied to a facsimile receiver, a transmitted facsimile signal can be magnified or reduced as desired at the receiver, and that in the case where it is applied to a copying apparatus, color scanner or the like, a manuscript can be magnified or reduced as desired.

In the conventional facsimile apparatus, the magnification or reduction of a reproduced picture is achieved in accordance with the ratio between the mechanical scanning at a transmitting station and that at a receiving station. Therefore, very great difficulties have been encountered in an attempt to change the magnifying or reducing factor as desired. It has also been difficult to construct a mechanism for achieving such magnification or reduction at a predetermined ratio. Among methods of electrically changing the scale factor are a method to reproduce a recorded tape with a relative speed between the recording and the reproducing speed, an electronic scanning method (of effecting the scanning by means of an electronic beam), and so forth. However, these methods cannot be put to practical use since much labor is required to obtain a final hard copy.

Accordingly, it is a primary object of the present invention to provide a variable scanning system for use with apparatus in which a first record is scanned so that a second record is reproduced, wherein use is made of a vibrating mirror system for effecting the main scanning, the magnification or reduction in the main scanning direction is effected by changing the amplitude of vibration (vibration range) of the vibrating mirror, the feed speed in the subscanning direction is changed correspondingly, and the size of the scanning light spot is controlled by changing the size in the subscanning direction of a slit which is one of the constitutional elements of an optical system adapted to focus light rays emanating from a light source at a recording medium so as to achieve the magnification or reduction in the subscanning direction, thereby producing a reproduced picture which is magnified or reduced as desired.

Another object of the present invention is to provide a variable scanning system for use with an apparatus in which a first record is scanned so that a second record is reproduced, wherein use is made of a vibrating mirror system, the magnification or reduction in the main scanning direction is achieved by changing the amplitude of vibration (vibration range) of the vibrating mirror, the feed speed in the subscanning direction is changed correspondingly, and the size of the main light spot is controlled by means of a variable focal distance type lens, thereby producing a reproduced picture which is magnified or reduced as desired.

Still another object of the present invention is to provide a variable scanning system for use with an apparatus in which a first record is scanned so that a second record is reproduced, wherein use is made of a vibrating mirror system for effecting the main scanning, the magnification or reduction in the main scanning direction is achieved by displacing a recording medium toward or away from the vibrating mirror, the feed speed in the subscanning direction is changed correspondingly, and the size of the scanning light spot is adjusted by controlling a variable focal distance type lens, thereby producing a reproduced picture which is magnified or reduced as desired.

Other objects, features and advantages of the present invention will become apparent from the following description taken in conjunction with the accompanying drawings, in which.

In the variable scanning system of the present invention, use is made of a vibrating mirror for effecting the main scanning, the width of the main scanning effected with respect to a recording medium by means of said vibrating mirror is changed, and at the same time the feed speed in the subscanning direction and the size of the scanning light spot are mechanically or optically changed correspondingly so that the subscanning width is changed, thus producing a reproduced picture which is magnified or reduced as desired.

The preferred embodiments of the present invention will be described with reference to the drawings.

Figure 1:
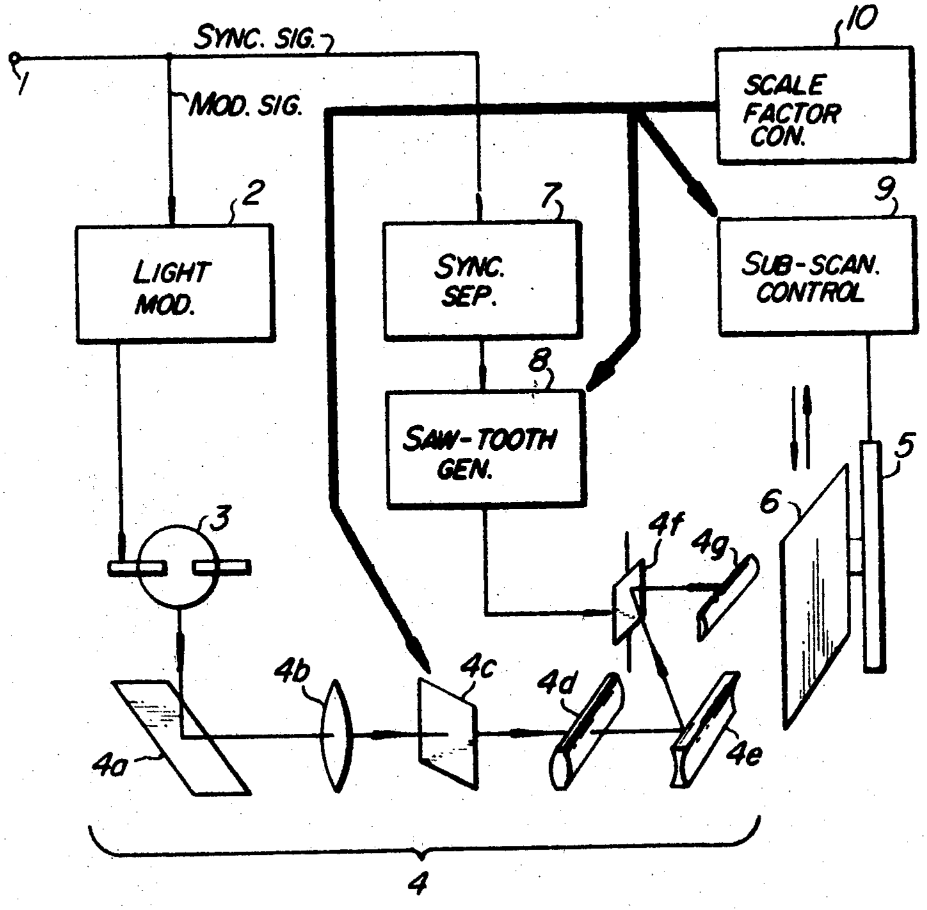
FIG. 1 is a schematic diagram showing the variable scanning system according to a first embodiment of the present invention.

FIG. 1 is a schematic diagram showing a first embodiment of the present invention as applied to a facsimile receiver, wherein numeral 1 represents a signal input terminal, 2 a light modulator circuit, 3 a light source (zenon lamp, glow lamp, etc.) the intensity of which is varied in accordance with an input signal, and 4 an optical system adapted to focus the light rays emanating from the light source 3 at a recording paper 6 carried by a subscanning mechanism 5 which will be described hereinafter. This optical system 4 includes a reflector *4a*, condenser lens *4b*, slit (aperture) *4c* the size of the opening portion of which is variable, lens *4d* for longitudinal focusing, lens *4e* for lateral focusing, vibrating mirror *4f* and lens *4g* for longitudinal focusing. These elements are arranged in the named order as viewed from the light source 3. Numeral 7 indicates a sync separator circuits, 8 a main scanning sawtooth wave generating circuit which is so designed as to control the synchronizing system so that the scanning is performed in such a manner that the recording is effected in correspondence to the phase relationship of an input signal, and 10 a scale factor controlling circuit adapted to control the main scanning sawtooth wave generating circuit 8 to thereby control the amplitude (vibration range) of the vibrating mirror *4f*. The scale factor controlling circuit 10 is also adapted to control a subscanning control circuit 9 so as to change the feed speed in the subscanning direction with the aid of the subscanning mechanism 5, and to control the opening of the slit *4c* to change the size of a scanning light spot, thus controlling the magnifying-reducing operation.

Description will now be made of the operation of this embodiment. An input signal which arrives at the input terminal 1 is supplied to the light modulator circuit 2 to intensity-modulate the light rays emanating from the light source 3. The light rays thus intensity-modulated are in turn focused at the vibrating mirror *4f* through the reflector *4a*, slit *4main scanning* , *lenses 4d* and *4e*, and thence projected onto a recording paper 6 through the lens *4g*. At this point, the aforementioned input signal has its synchronizing signals separated therefrom by means of the sync separator circuit 7, and the thus separated synchronizing signals are supplied to the main scanning sawtooth wave generating circuit 8, whereby the amplitude of vibration (vibration range) of the vibrating mirror *4f* is controlled so that scanning is effected with respect to the recording paper 6. In the present embodiment, the design is made such that the widths of the main scanning and subscanning with respect to the recording paper can be magnified or reduced as desired by controlling the main scanning sawtooth wave generating circuit 8, subscanning control circuit 9 and opening portion of the slit *4c* by means of the scale factor controlling circuit 10. Generally, the main scanning period cannot be varied since it depends upon an input signal. By changing the amplitude of the sawtooth wave available from the main scanning sawtooth wave generating circuit 8, however, it is possible to freely increase or decrease the width of recording to be effected on the recording paper 6 in said period, with the amplitude of vibration of the vibrating mirror 4*f* being maintained in the linear range thereof. If the width of the main scanning is changed, then the width of the sub-scanning should also be changed accordingly by changing the pitch thereof. Otherwise, a reproduced picture will be distorted both longitudinally and laterally. Therefore, if is essential to change both the subscanning speed and the width of the light spot for the subscanning. Hence, in the present embodiment, the design is made such that by controlling the sub-scanning mechanism 5, the feed speed in the subscanning direction is changed, and that the dimension of the opening portion of the slit 4*c* in the subscanning direction is changed.

With the foregoing embodiment, the change of scale in the main scanning direction is achieved by changing the amplitude of vibration of the vibrating mirror for the main scanning, and at the same time, the feed speed in the sub scanning direction and the dimension of the slit in the sub-scanning direction are changed to adjust the size of a light spot which scans on the recording paper, thereby achieving the magnification or reduction in the subscanning direction. Thus, it is possible to obtain a reproduced picture which is magnified or reduced as desired.

Figure 2:
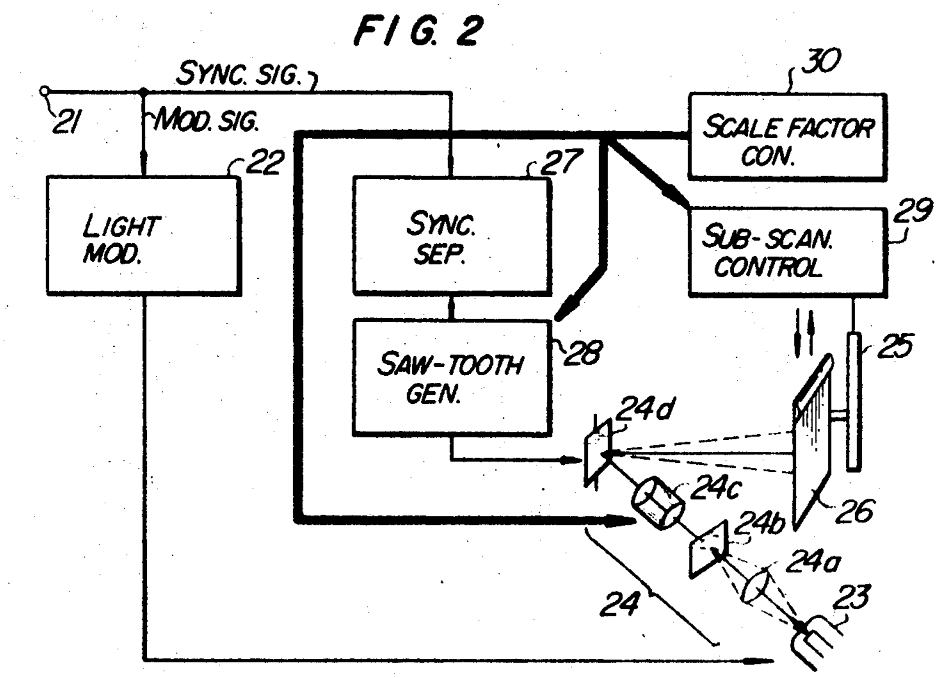
FIG. 2 is a schematic diagram showing the variable scanning system according to a second embodiment of the present invention.

Referring to FIG. 2, description will next be made of a second embodiment of the present invention. FIG. 2 is a schematic diagram showing the present invention as applied to a facsimile receiver, wherein numeral 21 represents a signal input terminal, 22 a light modulator circuit, 23 a light source which is modulated with an input signal so that the intensity thereof is changed, and 24 an optical system adapted to focus the light rays emanating from the light source 23 at a recording paper 26 carried by a subscanning mechanism 25 which will be described hereinafter. This optical system 24 includes a condenser lens 24*a*, slit 24*b*, variable focal distance type lens 24*c* consisting of a zoom lens, collimator lens or the like and vibrating mirror 24*d* for main scanning. These elements are arranged in the named order as viewed from the light source 23. Numeral 27 indicates a sync separator circuit, 28 a main scanning sawtooth wave-generating circuit which is so designed as to control the synchronizing system so that the scanning is performed in such a manner that the recording is effected in correspondence to the phase relationship of an input signal, 29 a sub-scanning control circuit adapted to control the subscanning mechanism 25, and 30 a scale factor controlling circuit which is adapted to control the main scanning sawtooth wave generating circuit 28 to thereby control the vibration range (amplitude of vibration) of the vibrating mirror 24*d* and which is also adapted to control the subscanning control circuit 29 so as to change the feed speed in the sub-scanning direction with the aid of the sub scanning mechanism 25. Furthermore, the circuit 30 is designed to control the variable focal distance type lens 24*c*, in accordance with said variations to change the focal distance of the vibrating mirror 24*d* with respect to the recording paper 26 to thereby adjust the size of the scanning light spot, thus making it possible to obtain a reproduced picture which is magnified or reduced as desired.

The operation of this embodiment will be described below. An input signal which arrives at the input terminal 21 is supplied to the light modulator circuit 22 to intensity-modulate the light rays emanating from the light source 23. The light rays emanating from the light source 23 are then projected onto the recording paper 26 through the condenser lens 24*a*, slit 24*b*, variable focal distance type lens 24*c* and vibrating mirror 24*d*. At this point, the synchronizing signals of the input signal separated by the sync separator circuit 27 are supplied to the main scanning sawtooth wave generating circuit 28 to control the amplitude of vibration (vibration range) of the vibrating mirror 24*d* so that the main scanning is effected on the recording paper 26. In the foregoing arrangement, in order to obtain a reproduced picture which is magnified or reduced as desired, the main scanning sawtooth wave generating circuit 28 is controlled by the scale factor controlling circuit 30 so that the width of the sawtooth wave is changed so as to change the amplitude of vibration of the vibrating mirror 24*d* within the linear range thereof. Thus, the magnification or reduction in the main scanning direction is achieved. At the same time, in order to achieve the corresponding magnification or reduction in the sub-scanning direction, the corresponding focal distance of the vibrating mirror 24*d* with respect to the recording paper 26 is changed by means of the variable focal distance type lens 24*c* to thereby adjust the size of the scanning light spot.

As described above, with the embodiment described above in connection with FIG. 2, it is possible to obtain a reproduced picture which is magnified or reduced as desired, by changing the vibration range of the vibrating mirror, changing the sub-scanning speed at the same time, and further adjusting the size of the scanning light spot by means of the variable focal distance type lens.

Figure 3:
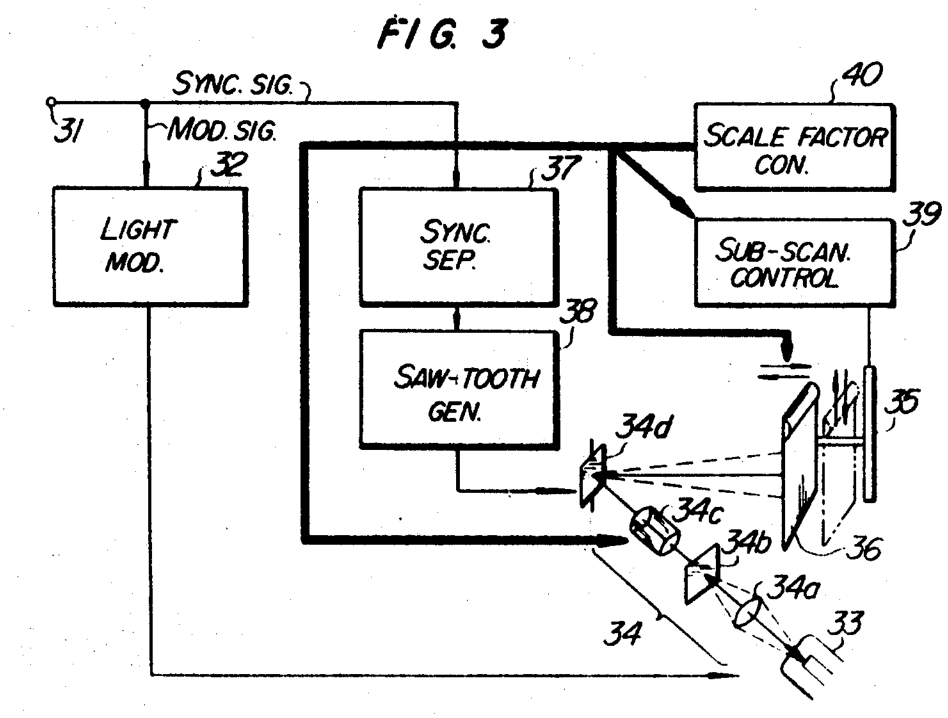
FIG. 3 is a schematic diagram showing the variable scanning system according to a third embodiment of the present invention.

Description will be made of a third embodiment of the present invention with reference to FIG. 3 which illustrates the present invention as applied to a facsimile receiver, wherein numeral 31 represents a signal input terminal, 32 a light modulator, 33 a light source of which the intensity is varied through modulation with an input signal, and 34 an optical system adapted to focus the light rays emanating from the light source 33 at a recording paper 36 carried by a sub-scanning mechanism 35 which will be described later. This optical system 34 includes a condenser lens 34*a*, slit 34*b*, variable focal distance type lens 34*c* consisting of a zoom lens, collimator lens or the like and vibrating mirror 34*d*. These elements are arranged in the named order as viewed from the light source 33. Numeral 37 indicates a sync separator circuit, 38 a main scanning sawtooth wave generating circuit which is so designed as to control the synchronizing system so that the scanning is performed in such a manner that the recording is effected in correspondence to the phase relationship of an input signal, 39 a subscanning control circuit adapted to control the subscanning mechanism 35, and 40 a scale factor controlling circuit. This magnifying-reducing factor controlling circuit 40 is adapted to displace the recording paper 36 toward or away from the vibrating mirror 34*d* to thereby achieve the magnification or reduction in the main scanning direction, and it is also adapted to change the speed in the sub-scanning direction correspondingly and control the variable focal distance type lens 34*c* to thereby change the focal distance of the vibrating mirror 34*d* with respect to the recording paper 36, thus adjusting the size of the scanning light spot.

In the aforementioned arrangement according to the third embodiment of the present invention, an input signal which arrives at the input terminal 31 is supplied to the light modulator circuit 32 to intensity modulate the light source 33. The light rays emanating from the light source 33 are projected onto the recording paper 36 through the condenser lens 34*a*, slit 34*b*, variable focal distance type lens 34*c* and vibrating mirror 34*d*. At this point, the synchronizing signals separated from the aforementioned input signal by the sync separator circuit 37 are supplied to the main scanning sawtooth wave generating circuit 38 to determine the vibration range of the vibrating mirror 34*d*. Thus, the main scanning is effected with respect to the recording paper 36.

In order to obtain a reproduced picture which is magnified or reduced as desired, the mechanism for displacing the recording paper 36 toward or away from the vibrating mirror 34*d* is controlled by means of the scale factor controlling circuit 40 so as to achieve magnification or reduction in the main scanning direction. At the same time, the feed speed in the subscanning direction is changed by means of the subscanning control circuit 39, and also the variable focal distance type lens 34*c* is controlled to change the focal distance of the vibrating mirror 34*d* with respect to the recording paper 36. Thus, the size of the scanning light spot is adjusted.

In the foregoing embodiment, the main scanning width is changed by changing the distance between the recording paper and the vibrating mirror, the subscanning speed is changed at the same time, and further the size of the scanning light spot is adjusted by means of the variable focal distance type lens, so that there is obtained a reproduced picture which is magnified or reduced as desire.

In any of the foregoing embodiments, the facsimile system in constituted so that the coincidence of cooperation factors between the transmitter and the receiver is maintained if the widths of scannings are changed; and the subscanning can be freely effected by means of no-step transmission or by changing the speed of an electric motor by changing the frequency. Alternatively, mechanical changeover may be utilized in the cases where the speed is changed in a stepped manner.

In the foregoing, the present invention has been described and illustrated as applied to a facsimile receiver. However, it is to be understood that the present invention can also equally be applied to a facsimile transmitter wherein the cooperation factor thereof is made to correspond to that of the receiver and the amplitude of a sawtooth wave or the distance between the manuscript and the vibrating mirror is selected so that the width of main scanning coincides with the width of the given manuscript and the subscanning speed is determined in accordance with the main depending on the speed of main scanning, thus achieving the desired purposes. The present system is by no means limited to such a facsimile receiver or transmitter as described above. Needless to say, it can also equally be applied to a copying apparatus having the functions of magnifying and reducing a manuscript, color scanner, and other similar apparatus.

As described above, with the variable scanning system according to the present invention, it is possible to obtain a picture which is magnified or reduced as described, by changing the scanning width. In addition, this system can be constructed with ease and at low cost. This constitutes a great advantage.

What we claim is

1. A variable scanning system wherein a recorded information is converted to an electrical signal by scanning a first record, and light rays emanating from a light source intensity-modulated with said electrical signal are focused and made to scan a recording medium so that a second record is reproduced, said system comprising means for changing the magnifying-reducing factor with respect to said first and second records, said means including an optical system consisting of the light source, lenses each adapted to focus more than one of lateral and longitudinal light rays and a slit having a variable opening portion to thereby focus the light rays emanating from said light source, a vibrating mirror adapted to effect the main scanning with respect to the recording medium, a main scanning sawtooth wave generating circuit adapted to control said vibrating mirror, a subscanning mechanism for effecting the subscanning, a subscanning control circuit for controlling said subscanning mechanism, and a scale factor controlling circuit for controlling the magnifying and reducing factor, wherein said main scanning sawtooth wave generating circuit, subscanning control circuit and the size in the subscanning direction of said slit are controlled in accordance with a signal available from said scale factor controlling circuit, thereby varying the main scanning and subscanning widths.

2. A variable scanning system according to claim 1, wherein said means for changing the magnifying-reducing factors with respect to the first and second records includes a light source, an optical system consisting of a variable focal distance type lens or the like adapted for focusing the light rays emanating from said light source, a vibrating mirror for effecting the main scanning with respect to the recording medium, a main scanning sawtooth wave generating circuit, a subscanning mechanism for effecting the subscanning, a subscanning control circuit for controlling said subscanning mechanism and a scale factor controlling circuit, wherein said main scanning sawtooth wave generating circuit, said subscanning control circuit and said variable focal distance type lens of said optical system are controlled in accordance with a signal available from said scale factor controlling circuit, thereby changing the main scanning and subscanning widths.

3. A variable scanning system according claim 1, wherein said means for changing the magnifying-reducing system with respect to the first and second records includes a light source, an optical system consisting of a variable focal distance type lens or the like adapted for focusing the light rays emanating from said light source, a vibrating mirror for effecting the main scanning with respect to a recording medium, a main scanning sawtooth wave generating circuit adapted to determine the vibration range of said vibrating mirror, a subscanning mechanism for effecting the subscanning, a subscanning control circuit adapted for controlling said subscanning mechanism, means for displacing said recording medium toward or away from said vibrating mirror, and a scale factor controlling circuit for controlling the magnifying-reducing power, wherein said means for displacing said recording medium toward or away from said vibrating mirror, said subscanning control circuit and said variable focal distance type lens of said optical system are controlled in accordance with a signal available from said scale factor controlling circuit, thereby changing the main scanning and subscanning widths.